United States Patent
Lang

[11] 3,833,299
[45] Sept. 3, 1974

[54] APPARATUS FOR NO-CONTACT MEASUREMENT OF THE VELOCITY, THE PATH OR THE RANGE OF OBJECTS

[75] Inventor: Karl Lang, Atzbach, Germany

[73] Assignee: Ernst Leitz GmbH, Wetzlar, Germany

[22] Filed: Dec. 12, 1972

[21] Appl. No.: 314,395

[30] Foreign Application Priority Data
Dec. 20, 1971 Germany............................ 2163200

[52] U.S. Cl................ 356/28, 356/156, 250/237 G, 250/225
[51] Int. Cl. ........................................... G01p 3/36
[58] Field of Search...................... 356/28, 169, 156; 250/237 G, 225

[56] References Cited
UNITED STATES PATENTS

| | | | |
|---|---|---|---|
| 3,482,107 | 12/1969 | Hock ............................... | 250/237.6 |
| 3,511,150 | 5/1970 | Whitney et al. ..................... | 356/28 |
| 3,518,007 | 6/1970 | Michiaki ito........................ | 356/113 |
| 3,552,857 | 1/1971 | Hock et al. ......................... | 356/152 |

FOREIGN PATENTS OR APPLICATIONS
402,427   5/1966   Switzerland..................... 250/237.6

*Primary Examiner*—Maynard R. Wilbur
*Assistant Examiner*—S. C. Buczinski
*Attorney, Agent, or Firm*—Krafft & Wells

[57] ABSTRACT

In a device for the no-contact measurement of the velocity, the path, or the range of objects without special optical markers with respect to a reference position, by imaging the object on a grating and measuring the light flux penetrating this grating by means of photoelectric elements, the output signals of which exhibit a frequency component proportional to the velocity of motion, the improvement comprising the support of the grating (3, 3„3″, 3‴, 14, 44) being transparent, whereas the grating lines are made to be reflective; and photoelectric recivers (5 7; 27–30) are connected after the grating so that their output signals produced from the coaction of the image of the object with the grating are pairwise in phase opposition to one another.

11 Claims, 11 Drawing Figures

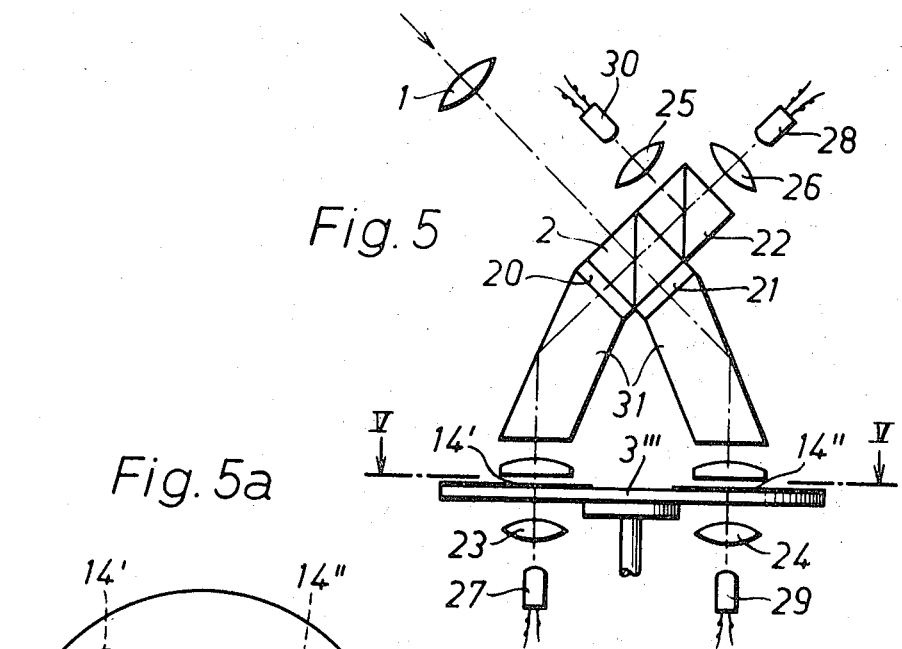
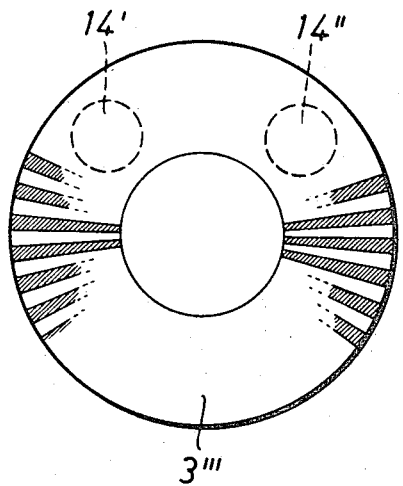
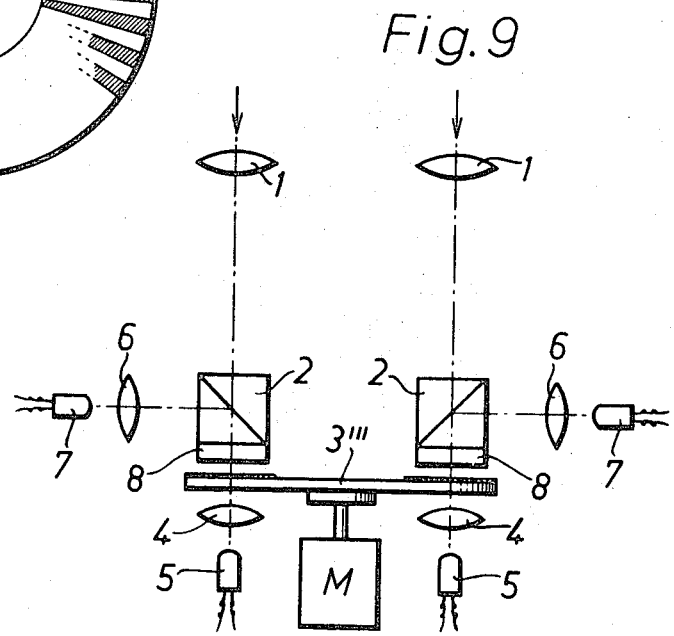

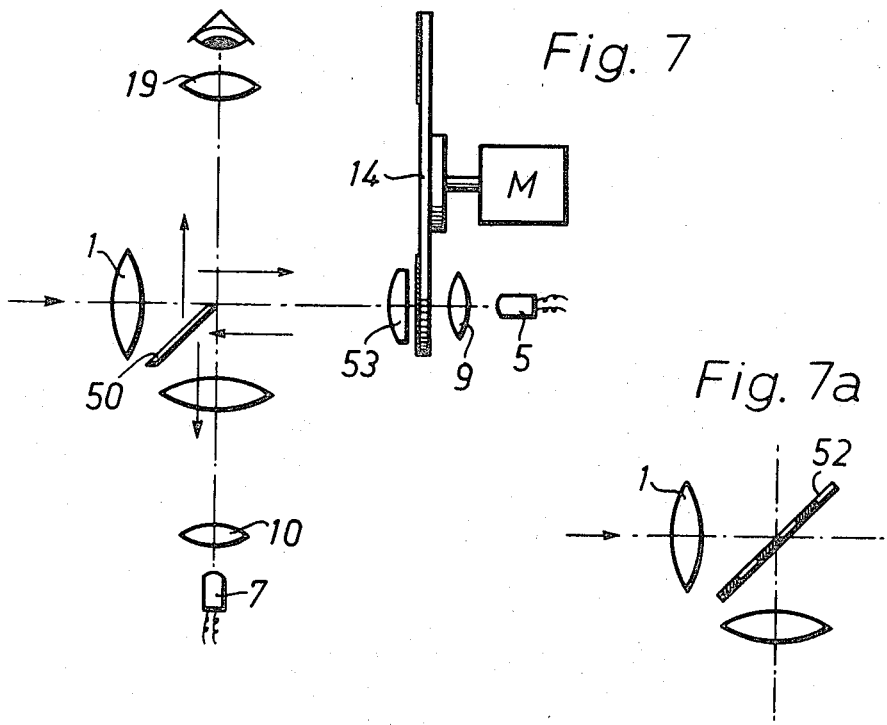
Fig. 7
Fig. 7a
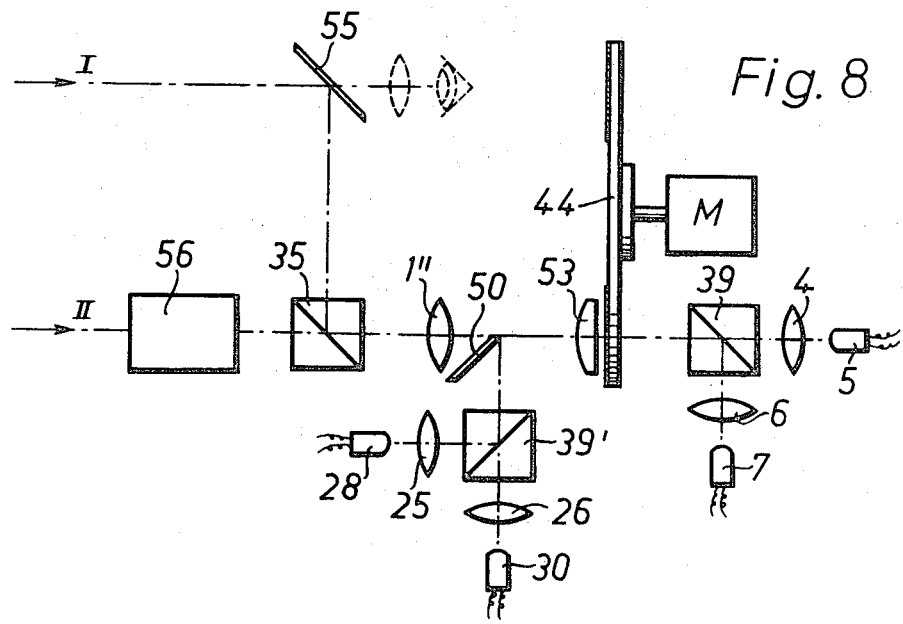
Fig. 8

APPARATUS FOR NO-CONTACT MEASUREMENT OF THE VELOCITY, THE PATH OR THE RANGE OF OBJECTS

CROSS-REFERENCES TO RELATED APPLICATIONS

Applicant incorporates by reference the disclosure of application Ser. No. 306,535 of Leitz, et al, filed Nov. 15, 1972, now U.S. Pat. No. 3,781,110 which issued Dec. 25, 1973 and application Ser. No. 311,775 of the present inventor, filed Dec. 4, 1972 now U.S. Pat. No. 3,768,022, which issued Oct. 23, 1973, which shows examples of an apparatus for Generating Phase Modulated Electrical Signals in Response to a Measured Annular or Linear Displacement.

Priority is claimed under 35 U.S.C. 119 for application Ser. No. P 21 63 200.8, filed Dec. 20, 1971, in the Patent Office of the Federal Republic of Germany.

BACKGROUND OF THE INVENTION

The invention relates to a device for the no-contact measurement of the velocity or path of objects without special optical markers with respect to a reference position.

Optical distance measuring devices have been known wherein the relative motion of an object with respect to a photoelectric receiver generates measuring variables dependent on the relative velocity. In this connection, three different methods are basically employed:

In the first method, the object to be measured is irradiated with monochromatic coherent radiation. Then, the light scattered from the object is collected, the frequency of which is affected due to Doppler shift. Thereafter, the frequency of the scattered light is measured by interference with the primary radiation or with light frequency-shifted in the opposite direction. This conventional method requires, in view of the necessary lasers and interferometers, an expenditure in apparatus which in many cases is unfeasible.

In a second method, the moving object is imaged into an image plane wherein at least two photoelectric scanners, displaced in the direction of motion, are arranged. The signal of the first scanner, disposed as the first in the direction of motion, is stored for a preselected period of time $\tau$ in a short-time storage means and thereafter compared, in a correlator, with the subsequent signal delivered by the second scanner displaced along the path $c$. In this method, the storage time $\tau$ is controlled so that the signal of the second scanner is chronologically congruent with the delayed signal of the first scanner. Thus, the velocity of the object image is obtained relative to the scanners, and from this value, the velocity $v_o$ of the object is obtained, via the imaging scale, as:

$$v_o' = c/\tau$$

This conventional method requires, with controllable storage means and correlator, a complicated, trouble-prone expenditure in apparatus and yields only an average velocity by way of the storage time $\tau$.

Finally, the moving object is imaged on a grating having $k$ lines per millimeter, behind which a photoelectric receiver receives the light coming from the object and preferably yields an alternating voltage when specified position frequency is present, in the brightness distribution of the object. The frequency $f$ of this alternating voltage is proportional a1 to the velocity of the object image $v$ relative to the grating and to $k$. The following applies:

$$f = v \cdot k$$

This signal is superimposed by longer period signals (constant light) corresponding to the integral over the image proportions with position frequencies not corresponding to $k$. In order to suppress this constant light proportion, a device is known having a special pair of photoelectric receivers with telescoped, strip-shaped electrodes. This device delivers a push-pull signal only from image portions having a position frequency corresponding to $k$, the in-phase proportions of other signals being eliminated by a difference forming bridge circuit. The special photoelectric receivers of this conventional arrangement again result in high expenditure, due to their difficult geometry, and they limit the number of strips, since they cannot be produced at any desired fineness where the strip number is in direct connection with the measuring accuracy of the system.

SUMMARY OF THE INVENTION

It is an object of the present invention to provide a device for the no-contact measurement of the velocity of objects without special optical markers with respect to a reference position, wherein, in an extremely simple manner, the above-described disadvantages of conventional devices are avoided. This device can readily be put into practice with commercially available optical and electronic components, and has great flexibility with respect to the specific characteristics of existing objects to be measured.

The present invention relates to a device for the no-contact measurement of the velocity or of the path of objects without special optical markers with respect to a reference position. The object is imaged on a grating and the light flux passing through this grating is measured with the aid of photoelectric means, the output signals of which exhibit a frequency component proportional to the velocity of motion. This device is distinguished from the prior art in that the support of the grating is transparent, whereas the grating lines are made to be reflective; and photoelectric receivers are connected after the grating so that their output signals resulting from the coaction of the image of the object with the grating are, in pairs, in phase opposition to one another. Advantageously, a polarizing beam splitter is provided in the beam path, and a quarter-wave plate is disposed between this splitter and the grating. Furthermore, a geometrical beam splitter is arranged in the beam path. In an advantageous embodiment, the grating itself is employed as the beam splitter. Also, it is possible to provide additional means for the visual observation of the object to be measured. Additional distinguishing features of this device are drive means for a preferably continuous movement of the grating relative to the optical axis and/or a point on this axis. Another feature is that the beam impinging from the object is imaged, after splitting by means of a polarizing beam splitter, upon different points of a radial grating rotating at a constant frequency, so that the imaging sites on the grating are shifted by preferably 90° with respect to one another with reference to the axis of rotation of the grating. Still another feature is that, for the purpose of measuring movement in two, preferably mutually vertical, coordinate directions, two gratings are provided, the line extensions of which with respect to each other correspond to the two desired measuring coordinate directions. These gratings are associated with a common polarizing beam splitter. In the beam path between this splitter and the gratings, there is respectively one quarter-wave plate; and the third exit surface of this polarizing beam splitter is associated with a further polarizing splitter which splits up the beam proportions reflected by the gratings with respect to their polarization directions. They are fed to separate photoelectric receivers, the output signals of which are pairwise in phase opposition with the output signals of photoelectric receivers connected after the gratings.

Finally, it is possible to provide means for varying the relative position between the grating and the image plane in the direction of the optical axis.

The special advantage of the present invention with regard to the prior art resides in that it permits, with the use of push-pull signals, the utilization of gratings with a high number of lines, which results in a considerable benefit in the signal quality and thus in the measuring accuracy.

BRIEF DESCRIPTION OF THE DRAWINGS

The novel device will be described hereinbelow with reference to the schematic illustrations, to wit:

FIG. 5 shows a device for two-coordinate measurement with a radial grating;

FIG. 5a is a top view along the line V—V of FIG. 5 in the direction of the axis of rotation of the grating;

FIG. 7 shows a device with visual observation via a pupil half-mirror;

FIG. 7a shows a modification of the pupil mirror of FIG. 7;

FIG. 8 shows a modification of the embodiment shown in FIG. 6; and

FIG. 9 shows a binocular variation of the arrangement of FIG. 5.

DESCRIPTION OF THE PREFERRED EMBODIMENTS

Figure 1:
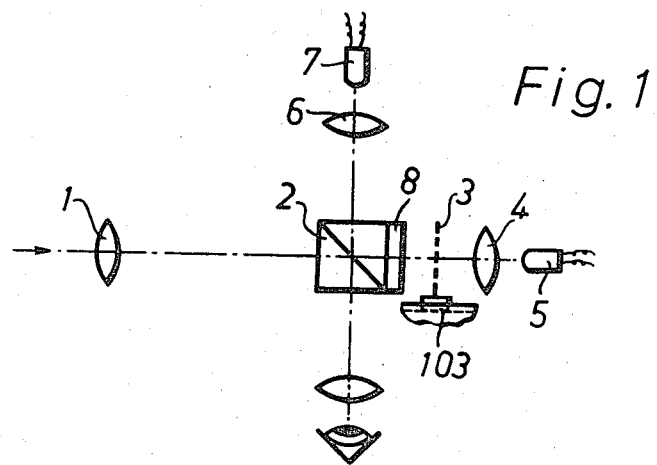
FIG. 1 shows a simple embodiment with visual observation.

In the arrangement of FIG. 1, an objective 1 images an object onto a grating 3 via a polarizing beam splitter 2. This grating is fashioned so that reflective markers are arranged on a transparent support. Such a grating is designated optische Maske and is disclosed in Austrian Pat. No. 261 712 which issued May 10, 1968 . The proportion of the beam passing through the grating 3 arrives, via a condenser lens 4, at a photoelectric receiver 5. The proportion of the beam reflected by the grating markers is fed, via the beam splitter 2, as well as a condenser lens 6, to a photoelectric receiver 7. As can be seen from the drawing, a quarter-wave plate 8 having the designation λ/4 -Platte and disclosed in Lueger: "Lexikon der Technik," Band 14, Deutsche Verlagsanstalt Stuttgart, 1969, page 205 is inserted between the beam splitter 2 and the grating 3. With this arrangement, push-pull signals are obtained with a minimum of losses from the proportions of the object image reflected and passed by the grating 3, respectively. The radiation impinging via the beam splitter 2 produces an electrical a.c. signal in the photoelectric receiver 5 after passing through the quarter-wave plate 8, through the grating 3, and the condenser 4. Upon the first and second passage through the quarter-wave plate 8, a beam portion reflected from the reflective lines of the grating 3 experiences an azimuthal polarization rotation by 90°, so that it is directed by the polarizing beam splitter 2 via the condenser 6 to the photoelectric receiver 7. Thereby, equally strong push-pull signals are obtained at the outputs of the receivers 5,7. By means of the polarizing beam splitter 2, a proportion for visual observation of the object is simultaneously separated from the light beam received by the objective 1.

Figure 2:
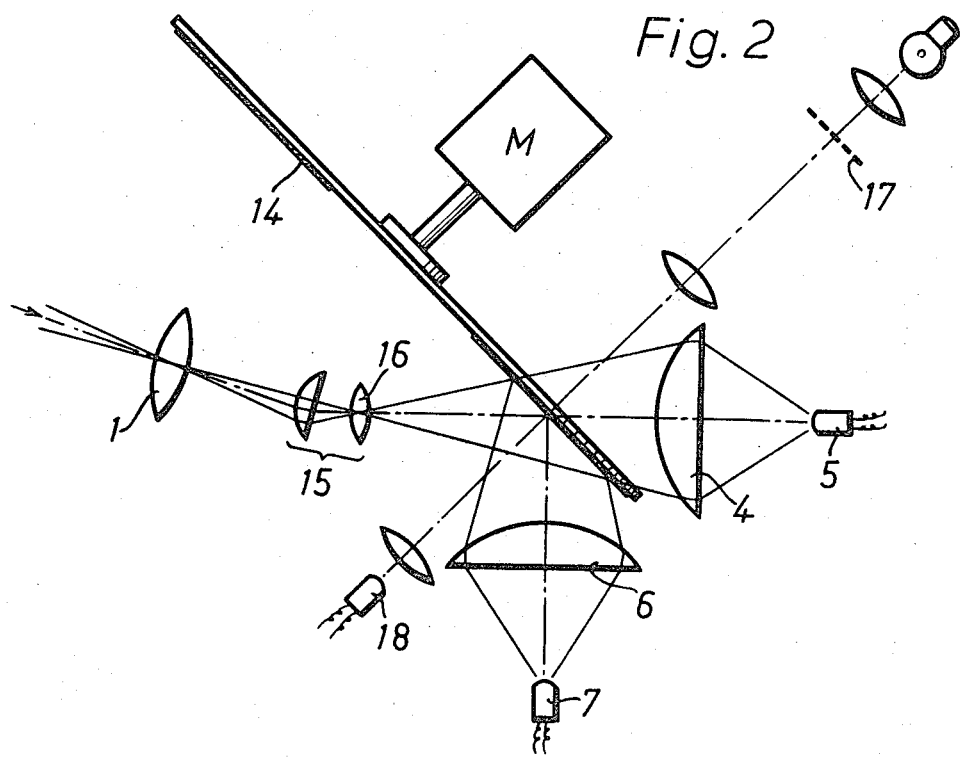
FIG. 2 shows an embodiment with a radial grating, compensation of the convergence of the grating lines, and production of the reference signal.

In FIG. 2, a device is shown for obtaining carrier-frequency measuring signals with a rotating grating disk 14. In this arrangement, the object to be measured is imaged in linear distortion via the objective 1 and an ocular 15 with the eye lens 16 being tilted in order to compensate for the centrally oriented position of the reflective lines of the grating disk 14 having the designation Radialgitter and disclosed in Lueger: "Lexikon der Technik," Band 14, Deutsche Verlagsanstalt Stuttgt. 1969, page 258. From the proportion of the image which is reflected from the moving grating 14 and transmitted, the push-pull measuring signals with velocity-proportional frequency modulation are obtained by means of the condensers 4, 6 and the photoelectric receivers 5, 7. From the image of a stationary reference grating 17 having the designation Beugungsgitter and disclosed in Lueger "Lexikon der Technik," Band 13, Deutsche Verlagsanstalt Stuttgt. 1969, p. 91 on the grating disk 14 having drive means M, a signal of a constant reference frequency is obtained at a photoelectric receiver 18. Depending on whether the image of the object moves with or against the direction of motion of the grating 14, signals are obtained, the frequency of which is lower or higher than the reference frequency.

Figure 3:
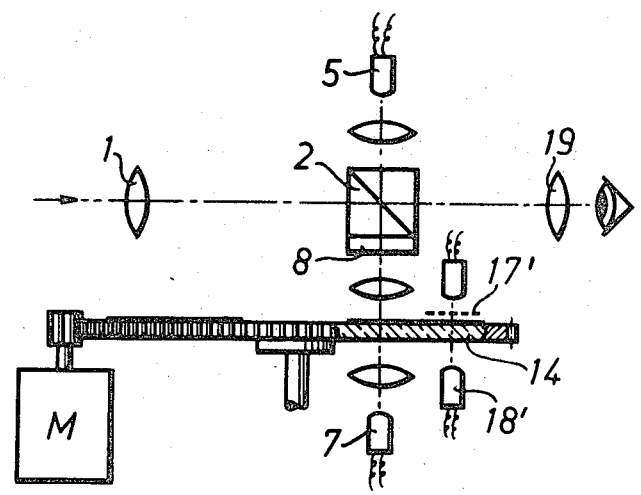
FIG. 3 shows a novel device with a radial grating, reference signal component, and visual observation.

FIG. 3 shows a modification of the arrangement shown in FIG. 2, with a visual observation means. The object to be measured is imaged by the objective 1 via a polarizing beam splitter 2 and a quarter-wave plate 8 connected thereto on a radial grating 14. A portion of the impinging light from the object serves for visual observation of the object in conjunction with an ocular 19. The combined reflected lighttransmitted light grating 14 separates the image content into two phase opposed proportions. The reflected proportion passes to the photoelectric receiver 5, with a polarization plane rotated by 90° on the quarter-wave plate; the transmitted proportion passes to the receiver 7. The evaluation of the electrical output signals of these receivers is conducted in a conventional manner and thus is not described herein (for example by means of a push-pull amplifier as disclosed in Reference Data for Radio Engineers 1957, ITT-Corporation New York, p. 447). In this embodiment, an electrical reference signal is obtained by imaging a reference grating 17' on an angular region of the radial grating 14 corresponding preferably to the object image, so that the photoelectric receiver 18' receives only the transmitted chopped light with a constant frequency corresponding to the rotational frequency of the grating 14 which is rotated by gearing attached to drive means M.

Figure 4:
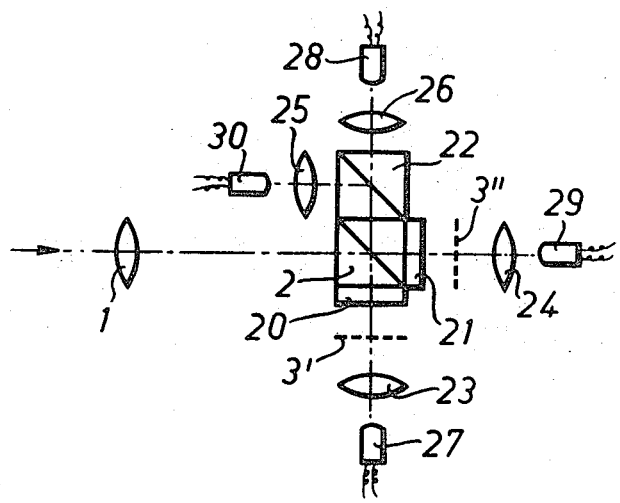
FIG. 4 shows a device with scanning of two gratings for two-coordinate measurement.

The device shown in FIG. 4 is suitable for measuring in two intersecting coordinate directions. The objective 1 transmits the image, via the polarizing beam splitter 2, to two gratings 3', 3" which again exhibit reflective markers on a transparent substrate. The two object images yield paired push-pull signals in cooperation with these gratings and quarter-wave plates 20,21, a further polarizing beam splitter 22, as well as condensers 23,24,25,26, at the photoelectric receiver pairs 27,28 and 29,30, which push-pull signals are associated with the coordinate directions.

FIG. 5 shows a variation of the above-described arrangement, to the effect that here only one grating 3''', designated as Radialgitter and disclosed in Lueger: "Lexikon der Technik" Band 14, Deutsche Verlagsanstalt Stuttgart, 1969, page 258, is employed which takes over the functions of gratings 3', 3" with different zones 14', 14". As a result, additional imageconducting means 31 designated as Lichtleitstab and disclosed in Lueger: "Lexikon der Technik" Band 14, Deutsche Verlagsanstalt Stuttgart, 1969, page 33, are provided which establish the connection between the beam splitter 2 and the grating zones.

Figure 6:
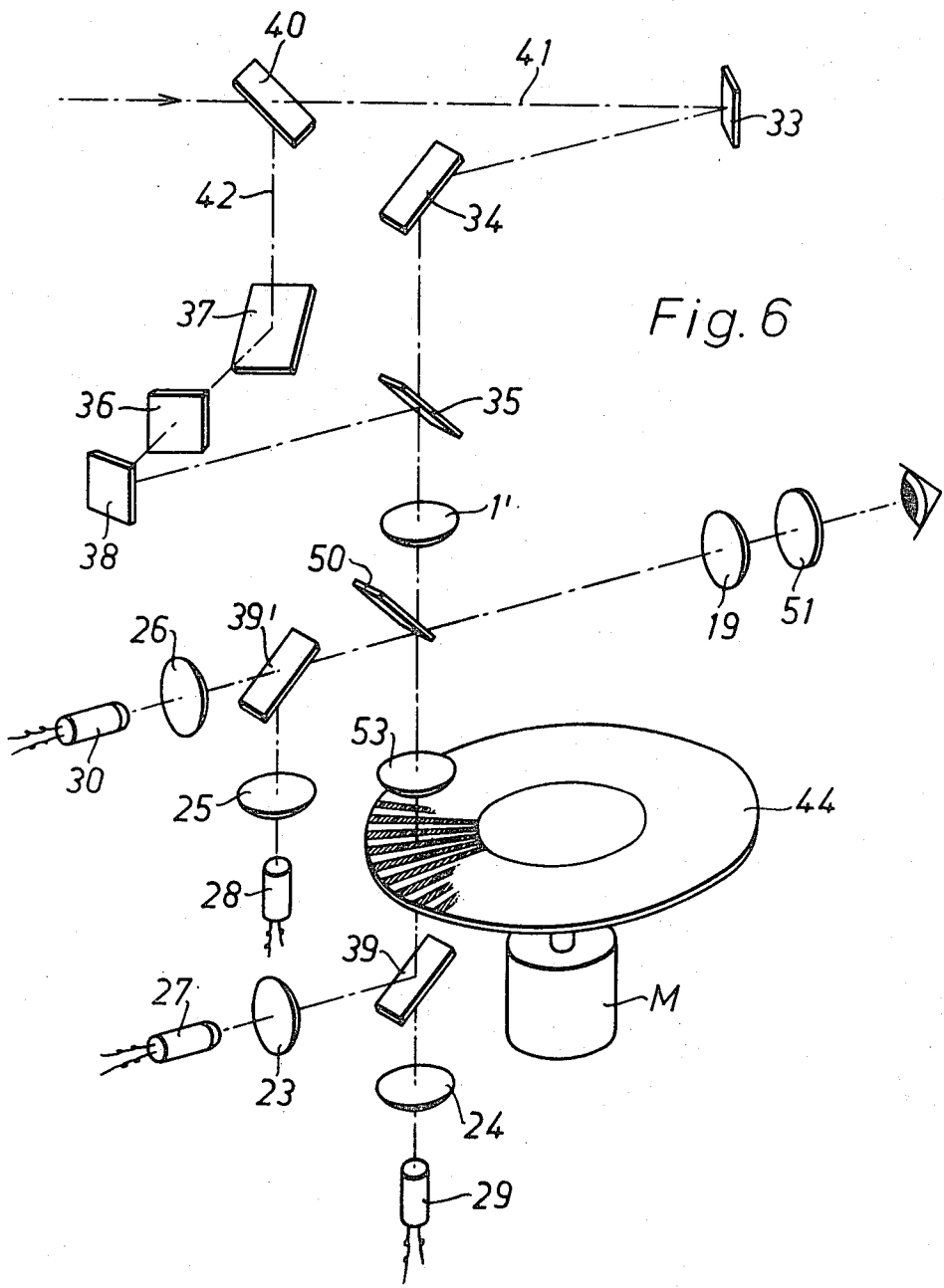
FIG. 6 is a further embodiment of the novel device for measuring in two coordinate directions.

FIG. 6 illustrates a device wherein the light coming from the object to be measured is split up, at a polarizing beam splitter 40, into the beams 41,42. The beam 41 images the object into the plane of the radial grating 44 designated as Radialgitter and disclosed in Lueger: "Lexikon der Technik," Band 14, Deutsche Verlagsanstalt Stuttgart, 1969, page 258, via deflecting mirrors 33,34, a polarizing beam collector 35, as well as an objective 1' and a geometrical beam splitter in the form of a pupil-dividing mirror 50 designated as Strahlenteiler and disclosed in Lueger: "Lexikon der Technik," Band 14, Deutsche Verlagsanstalt Stuttgart, 1969, page 468, with adjacent field lens 53 (the position of which is described in greater detail in connection with the following FIG. 7). The beam 42 is subjected to an azimuthal image rotation by 90° on its way via a half-wave plate 36 and the deflecting mirrors 37,38, prior to being recombined with the beam 41 in the splitter 35, so that the two images are superimposed in a mutually vertically intersecting position in the plane of the grating 44, with respect to the orientation of these images. In order to preserve in this method a mutually vertical polarization of the two images, the polarization direction of the beam 42 is azimuthally pre-rotated by 90° in the corresponding direction during passage through the half-wave plate 36. The proportions of the two imaging beams 41, 42 penetrating the grating are separated at the polarizing beam splitter 39 and fed to the photoelectric receivers 27, 29 via condensers 23, 24. The proportions of the beams 41, 42 reflected from the grating are fed, via the pupil-dividing mirror 50, to another polarizing beam splitter 39' which is connected, via condensers 25, 26, with two photoelectric receivers 28, 30. The signals of the receiver pairs 29, 30 and 27, 28 respectively, are in phase opposition and are of the same magnitude. Part of the light flux is fed, by means of the mirror 50, to an ocular 19 for visual observation. A polarizing filter 51 eliminates one image direction, depending on its position.

In the arrangement of FIG. 7, a pupil half mirror 50 separates a portion of the light from the object impinging via the objective 1 for purposes of visual observation via an ocular 19. The remaining object light serves, in the manner described above, in conjunction with the grating 14, associated here with a field lens 53, the condensers 9, 10, and the photoelectric receivers 5, 7, for obtaining the push-pull signals for measuring the velocity value in one coordinate. In this connection, the receiver 7 obtains its light via the reflective backside of the pupil half mirror 50. The field lens 53 is inserted in the beam path so that its focal point is in the point of intersection of the optical axis with the mirror 50. This ensures that the reflected light always finds a reflective surface. The mirror 50 can also be replaced by a bilaterally reflective 1:1 grating 52, designated as optische Maske and disclosed in Austrian Pat. No. 261 712, disposed asymmetrically with respect to the optical axis (FIG. 7a). The advantage of the arrangement shown in this figure resides in that the polarizing beam splitter can be omitted.

In all devices illustrated hereinabove, the starting point of the consideration was that only one beam of rays is provided impinging from the object. However, in certain cases, especially with a view toward simplicity of the optical arrangement, it can be advantageous to employ two beams impinging from the object. One embodiment in this connection is shown in FIG. 8, where two beams of rays I and II emanate from the object. The beam I is fed to a polarizing beam splitter 35 via a deflecting mirror 55, whereas the beam II impinges on this polarizing beam splitter after passing through an image-rotating component system 56, for example in the form of a rotatably mounted, imagerotating prism designated as Reflexionsprismen and disclosed in Lueger: "Lexikon der Technik," Band 14, Deutsche Verlagsanstalt Stuttgt, 1969, p293. The beam composed of the proportions of both beams I and II passes through an objective 1", as well as a field lens 53, and then impinges on a rotating grating 44 carrying reflective markers on a transparent carrier. The beam proportions penetrating the grating are fed, by means of a polarizing beam splitter 39 connected thereafter and via condensers 4,6, to two photoelectric receivers 5, 7. The proportions of the beam reflected from the grating pass, via the field lens 53 as well as a pupil half mirror 50, to a polarizing beam splitter 39' which feeds these proportions, after a division in correspondence with their polarization directions, to photoelectric receivers 28, 30 via condensers 25, 26. The output signals of the above-mentioned receivers are pairwise in phase opposition. By an adjustment of the structural group 56, it is possible to vary the mutual direction of the measuring coordinates. Of course, it is possible to add means for visual observation and connect them after the polarizing beam splitter 35 or the deflecting mirror 55.

In the same manner, a binocular variant can be provided for the arrangement shown in FIG. 5. Such a modification is illustrated in FIG. 9. As can be seen therefrom, this arrangement is a duplication of the arrangement illustrated in FIG. 1, with the difference that, for both arrangements, one common rotating grating 3''' is provided.

If it is desired to measure the location, then, in the forms of the novel device with directional indication, the number of traversed periods must be counted at the output of the comparator, taking into account the likewise existing directional information.

If it is desired to measure the range of an object, then care must be taken that the grating or gratings can also move in parallel to the optical axis relative to the image plane.

For this purpose, it is possible, for example, to fashion an arrangement according to FIG. 5 in such a manner that the grating is mounted obliquely on its axle of rotation and therefore tumbles about its axis upon rotation. Consequently, an amplitude modulation of the envelope curve results which, per rotation of the disk, yields a period, the phase position of which relative to the movement of the grating disk depends on the position of the focal plane relative to the optical axis. By feeding this envelope curve signal, together with a reference signal for the rotation, to a conventional phase comparison stage, then a signal is obtained corresponding to the distance of the object being measured.

In the embodiment of FIG. 1, for the same purpose, the grating 3 can be attached to a slide 103 arranged to be longitudinally displaceable in parallel to the optical axis. The adjustment can here be carried out manually.

I claim:

1. An apparatus for the no-contact measurement of the velocity, the path or the range of objects without special optical markers with respect to a reference position comprising an objective means with an optical axis for projecting an image of said objects to an image plane located along the optical axis, a grating located along the optical axis receiving said projected image and emitting light which has penetrated the grating, and photoelectric means for receiving said penetrated light and generating signals proportional to the velocity of motion of the object, the improvement comprising:

said grating (3, 3', 3'', 3''', 14, 44) having a transparent support and reflective grating lines;
said photoelectric means comprising at least two photoelectric receivers (5, 7: 27–30) the outputs of which are pairwise in phase opposition; and
said reflective grating lines reflecting an image of said objects to at least one of said photoelectric receivers and said transparent support projecting an image of said objects to at least another of said photoelectric receivers.

2. The apparatus of claim 1, wherein a geometrical beam splitter (50;52) is located along the optical axis between said means for projecting and said grating.

3. The apparatus of claim 1, wherein the grating is also a beam splitter.

4. The apparatus of claim 1, wherein drive means are provided for the continuous movement of the grating relative to the optical axis.

5. The apparatus of claim 1, wherein drive means are provided for the continuous movement of the grating relative to a point on the optical axis.

6. The apparatus of claim 1, wherein a polarizing beam splitter (2) is located along the optical axis between said means for projecting and said grating, said grating is a radial grating (3''') with an axis of rotation having means for rotating at a constant frequency and means for shifting the sites of said image on the grating by 90° with respect to one another and with reference to said axis of rotation.

7. The apparatus of claim 1, wherein for the purpose of measuring motion in two mutually perpendicular coordinate directions, said grating comprises two gratings (3', 3''), the position of the line directions of these grating with respect to one another corresponding to the two desired measuring coordinate directions; a first common polarizing beam splitter (2) is located in front of said gratings; a quarter-wave plate (20, 21) is arranged respectively in the optical axis between said first beam splitter and said gratings; and said beam splitter has a third exit surface associated with a second polarizing beam splitter (22) for splitting up the proportions of the beam reflected by said gratings according to their directions of polarization and feeding them to separate first photoelectric receivers (28, 30) which are pairwise in phase opposition with second photoelectric receivers (27, 29) connected after said gratings.

8. In an apparatus for the no-contact measurement of the velocity, the path or the range of objects without special optical markers with respect to a reference position comprising an objective means with an optical axis for projecting an image of said objects to an image plane located along the optical axis, a grating located along the optical axis receiving said projected image and emitting light which has penetrated the grating, and photoelectric means for receiving said penetrated light and generating signals proportional to the velocity of motion of the object, the improvement comprising:

said grating having a transparent support and reflective grating lines;
said photoelectric means comprising at least two photoelectric receivers the outputs of which are pairwise in phase opposition;
a polarizing beam splitter located along the optical axis between said means for projecting and said grating for projecting an image of the objects from said reflective grating lines to at least one of said photoelectric receivers; and
a quarter-wave plate located along the optical axis between said beam splitter and said grating.

9. The apparatus of claim 8, wherein means (10; 19,51) for the visual observation of the object to be measured are provided.

10. The apparatus of claim 8 wherein means are provided for varying the relative position between said grating and the image plane in the direction of the optical axis.

11. In an apparatus for the no-contact measurement of the velocity, the path or the range of objects without special optical markers with respect to a reference position comprising an objective means with an optical axis for projecting an image of said objects to an image plane located along the optical axis, a grating located along the optical axis receiving said projected image and emitting light which has penetrated the grating, and photoelectric means for receiving said penetrated light and generating signals proportional to the velocity of motion of the object, the improvement comprising:

said grating having a transparent support and reflective grating lines;
said photoelectric means comprising at least two photoelectric receivers the outputs of which are pairwise in phase opposition and are mounted adjacent opposite sides of said grating;
drive means are provided for the continuous rotation of the grating relative to the optical axis; and
means for obtaining reference signals based on the speed of rotation are located on an extension of a line connecting the axis of rotation of the grating and the imaging site.

* * * * *